(12) United States Patent
Gandhi

(10) Patent No.: US 7,041,840 B2
(45) Date of Patent: May 9, 2006

(54) ANTIOXIDANT TRIACYLGLYCEROLS AND LIPID COMPOSITIONS

(75) Inventor: Neena Gandhi, Edmonton, CA (US)

(73) Assignee: Alberta Research Council Inc., Edmonton (CA)

( * ) Notice: Subject to any disclaimer, the term of this patent is extended or adjusted under 35 U.S.C. 154(b) by 163 days.

(21) Appl. No.: 10/248,104

(22) Filed: Dec. 18, 2002

(65) Prior Publication Data

US 2004/0122093 A1 Jun. 24, 2004

(51) Int. Cl.
*C07C 57/00* (2006.01)

(52) U.S. Cl. .................................................. 554/227

(58) Field of Classification Search ................. 554/227
See application file for complete search history.

(56) References Cited

U.S. PATENT DOCUMENTS

| | | | |
|---|---|---|---|
| 2,822,371 A * | 2/1958 | Nichols ..................... 554/115 |
| 4,607,052 A | 8/1986 | Mendy et al. .............. 514/547 |
| 4,665,057 A | 5/1987 | Nelson et al. |
| 4,701,469 A | 10/1987 | Mendy et al. .............. 514/547 |
| 4,832,975 A | 5/1989 | Yang ........................ 426/607 |
| 4,847,296 A | 7/1989 | Babayan et al. ............ 514/552 |
| 4,871,768 A | 10/1989 | Bistrian et al. ............ 514/547 |
| 4,948,811 A | 8/1990 | Spinner et al. ............ 514/560 |
| 4,952,606 A | 8/1990 | Babayan et al. ............ 514/552 |
| 5,081,105 A | 1/1992 | Bistrian .................... 514/2 |
| 5,208,356 A | 5/1993 | Pariza et al. |
| 5,258,197 A | 11/1993 | Wheeler et al. ............ 426/607 |
| 5,279,846 A | 1/1994 | Okumura .................... 426/601 |
| 5,288,512 A | 2/1994 | Seiden ...................... 426/607 |
| 5,312,836 A | 5/1994 | Bistrian .................... 554/224 |
| 5,378,490 A | 1/1995 | Wheeler et al. ............ 426/606 |
| 5,411,756 A | 5/1995 | Wheeler et al. ............ 426/607 |
| 5,456,939 A | 10/1995 | Wheeler et al. ............ 426/660 |
| 5,508,048 A | 4/1996 | Padley ...................... 426/33 |
| 5,552,174 A | 9/1996 | Wheeler et al. ............ 426/607 |
| 5,565,232 A | 10/1996 | Wheeler et al. ............ 426/607 |
| 5,571,553 A | 11/1996 | Stein ........................ 426/607 |
| 5,656,667 A | 8/1997 | Breivik et al. ............. 514/560 |
| 5,661,180 A | 8/1997 | DeMichele et al. ......... 514/547 |
| 5,662,953 A | 9/1997 | Wheeler et al. ............ 426/2 |
| 5,670,540 A | 9/1997 | Horrobin et al. .......... 514/549 |
| 5,681,608 A | 10/1997 | Cain et al. ................ 426/606 |
| 5,866,703 A | 2/1999 | Horrobin et al. .......... 554/227 |
| 5,876,916 A | 3/1999 | Brunengraber et al. ..... 435/1.2 |
| 5,935,828 A | 8/1999 | Zaks et al. ................ 435/134 |
| 5,962,712 A | 10/1999 | DeMichele et al. ......... 554/224 |
| 5,968,727 A | 10/1999 | Brunengraber et al. ..... 435/1.2 |
| 6,013,665 A | 1/2000 | DeMichele et al. ......... 514/458 |
| 6,086,789 A | 7/2000 | Brunengraber et al. ..... 252/399 |
| 6,103,292 A | 8/2000 | Del Vecchio ............... 426/601 |
| 6,160,007 A | 12/2000 | DeMichele et al. ......... 514/458 |
| 6,177,580 B1 | 1/2001 | Timmermann et al. ..... 554/169 |
| 6,180,671 B1 | 1/2001 | Freedman et al. .......... 514/560 |
| 6,228,367 B1 | 5/2001 | Watson ...................... 424/768 |
| 6,238,926 B1 | 5/2001 | Liu et al. .................. 436/37 |
| 6,248,909 B1 | 6/2001 | Akimoto et al. ............ 554/1 |
| 6,277,432 B1 | 8/2001 | Chang ....................... 426/602 |
| 6,369,252 B1 | 4/2002 | Akoh ........................ 554/227 |
| 6,417,231 B1 | 7/2002 | Greenway et al. |

FOREIGN PATENT DOCUMENTS

| | | |
|---|---|---|
| CA | 2059837 | 7/1992 |
| CA | 2204141 | 5/1996 |
| CA | 2151820 | 11/2000 |
| EP | 0 366 632 A1 | 2/1988 |
| EP | 0 265 699 B1 | 5/1988 |
| EP | 0 271 909 A2 | 6/1988 |
| EP | 0 965 340 A1 | 12/1999 |
| EP | 0 739 592 B1 | 10/2001 |
| WO | WO 90/12080 | 10/1990 |
| WO | WO 91/03944 | 4/1991 |

OTHER PUBLICATIONS

Xuehing Xu, "Production of specific-structured triacylglycerols by lipase-catalyzed reactions: a review", Paper•Eur. J. Lipid Sci. Technol. 2000, pp. 287–303.

Naalsund, T. et al., "Synthesis of a Triantioxidant Compound: Combination of Beta–APO–8'–Carotenoic Acid Selenacaproyloic Acid and Trolox in a Triglyceride", Chemistry and Physics of Lipids, Limerick, IR, vol. 112, 2001, pp. 59–65 XP000926796 ISSN: 0009-3084.

Houte, H. et al, "Synthesis of Structured Lipids and Ether Lipids with Antioxidants: combination of a selene fatty acid and a selene fatty alcohol with a carotenoic acid in glyceride molecules", Chemistry and Physics of Lipids, Limerick, LR, vol. 105, No. 1, 2000, pp. 105–113.

Shu–Jang Kuo and Kirk, L. Parkin: "Acetylacylglycerol formation by lipase in microaqueous milleu: Effects of acetyl group donor and environmental factors", Journal of Agricultural and Food Chemistry, vol. 43, No. 7, 1995, pp. 1775–1783, XP002276735.

Lakritz, L., and Schwartz, D.P.: Formation of Oxo– and Hydroxyfatty acids in irradiated Chickens, Meat Science, vol. 40, 1995, pp. 279–285, XP002276708.

Xuebing Xu, "Production of specific-structured triacliglycerols by lipase–catalyzed reactions: a review", Paper–Eur.J. Lipid Sci. Technol. 2000, pp. 287–303.

* cited by examiner

*Primary Examiner*—Deborah D. Carr
(74) *Attorney, Agent, or Firm*—Bennett Jones LLP

(57) ABSTRACT

A lipid composition includes triacylglycerols that include unsaturated fatty acids such as alpha linolenic acid and antioxidant moeities such as pyruvic acid.

14 Claims, No Drawings

ANTIOXIDANT TRIACYLGLYCEROLS AND LIPID COMPOSITIONS

BACKGROUND OF INVENTION

The present invention relates to a novel triacylglycerol incorporating an antioxidant moiety and lipid compositions comprising triacylglycerols including antioxidant moieties and unsaturated fatty acids.

Fatty acids are saturated or unsaturated aliphatic monocarboxylic acids, usually with an even number of carbon atoms that occur naturally in the form of glycerides in fats and fatty oils, waxes and essential oils. Saturated fatty acids have the general formula, $C_nH_{(2n+1)}COOH$. Hydroxy-fatty acids such as ricinoleic acid are also known to be present naturally in certain oils. All fatty acids are carboxylic acids, which is a broad term that encompasses any compound with a carboxylic group, COOH. Fatty acids are numbered from the carboxylic carbon atom. The position of double bonds is indicated by the Greek letter delta (δ) followed by the carbon number of the double bond, i.e., C 20:5 omega-3 δ 5,8,11,14,17. The omega (ω) notation refers to the position of a double bond as an indicated number of carbon atoms from the non-carboxy terminal end of an unsaturated fatty acid. The designation for eicosapentaenoic acid, an omega-3 polyunsaturated fatty acid, is C 20:5 ω-3 δ 5,8,11,14,17. Docosapentaenoic acid is C 22:5 ω-3 δ 7,10,13,16,19 and docosahexaenoic acid (DHA) is C 22:6 ω-3 δ 7,10,13,16,19. The designation omega-6 (ω-6) refers to a fatty acid such as linoleic acid that has a double bond which is at carbon position six from the non-carboxy terminal end of the fatty acid.

The ω-3 fatty acids are essential for maintenance of health and prevention of disease. As noted above, DHA is a ω-3 fatty acid having 22 carbon atoms and three double bonds. It is the major component of insulation tissue for the retinal photoreceptors. It plays a major role in the [1]: • Maintenance of cell membrane fluidity in brain and eyes • Reduction of intraocular pressure • Constant renewal of retinal components after oxidative damage • Reduction of clogging/hardening of arteries • Enhancement of visual acuity Thus, a supply of DHA, would be useful in preventing vision disorders such as age-related macular degeneration and glaucoma through the reduction of arterial plaque and intraocular pressure. In fact, the ω-3 fatty acids cause a lowering of blood pressure throughout the body's arterial network, reduction in cholesterol levels, as well as vasodilation resulting in the alleviation of coronary heart disease.

The ω-3 fatty acids also act as anti-inflammatory agents, making them beneficial for patients with rheumatoid arthritis and other inflammatory ailments. These acids also protect myelin, which shields the nerves, and may be useful in treating or ameliorating a variety of neural disorders such as dementia or depression. These fatty acids may also be helpful in preventing cancer. However, due to their high unsaturation, they are quite unstable and subject to oxidation at the ω-3 double bond.

DHA can be supplied to the body either as dietary DHA or in precursor form as alpha-linolenic acid (ALA), also from a dietary source. Dietary DHA originates mainly from fish oils with the associated drawbacks such as the fishy odor and possible mercury contamination. However, findings from animal studies suggest that brain cells may prefer to make DHA from its precursor, ALA, rather than absorb it pre-formed [2].

ALA is obtained from plant seed oils such as oils from flaxseed, perilla, hemp, canola or soybean and is relatively odor-free. A comparison between the properties of ALA and DHA indicates that ALA supplementation is also superior to that of DHA as a result of many different factors such as:

1. Price: Cost of dietary DHA supplementation even without extraction and processing from fish oil is very high.
2. Absorption: The pancreatic lipase activity towards fatty acids decreases with chain length. Consequently, DHA is not as well accepted as substrate and is released more slowly from triacylglycerols as compared to ALA.
3. Both achieve similar effects: ALA can be converted to DHA to the extent required by the body even in preterm infants. The brain/retina also has a capability for the conversion.
4. Stability: ALA with its three double bonds is less prone to oxidative damage than DHA with its six double bonds.
5. Concentration: The nervous system is not protected against a large excess of DHA, which could increase n–3/n–6 ratio and could lead to abnormal function, and which might be difficult to reverse. This DHA excess is avoidable by supplying the precursor, ALA, which will be converted to DHA as required by the body.

Consequently, it may be preferable to supply DHA through its precursor, ALA, in nutraceutical compositions and products.

It is known that mitochondrial and peroxisomal fatty oxidation rates increase with increasing dietary levels of ALA. The activity of enzymes such as carnitine palmitoyltransferase, acyl-CoA oxidase, 3-ketoacyl-CoA thiolase, and 2,4-dienoyl-CoA reductase is enhanced. Smaller but significant increases by ALA of the activity of acyl-CoA dehydrogenase, enoyl-CoA hydratase, and delta 3, delta 2-enoyl-CoA isomerase have also been observed. However, dietary ALA was reported to greatly reduce the activities of some enzymes such as 3-hydroxy-acyl-CoA dehydrogenase and pyruvate kinase. Therefore, while β-oxidation of fatty acids is higher for unsaturated fats, the activity of pyruvate kinase (which converts glucose catabolite, phosphoenol pyruvate into pyruvate) an important enzyme in the glycolysis pathway is reduced, implying lesser energy. An exogenous supply of pyruvic acid will also enable further stimulation of the fatty acid anabolic pathways to convert them into their more unsaturated counterparts rather than their channeling towards β-oxidation.

Hence, it may be beneficial to supplement ALA with pyruvic acid to offset this effect. Pyruvic acid is a three-carbon alpha-keto acid with relatively strong antioxidative activity and may enhance the stability of ALA when combined in a formulation. However, pyruvic acid is a strong, unstable ketoacid, which cannot be administered orally or parenterally. Salts of pyruvic acid are also not physiologically suitable. Amino-compounds containing pyruvate such as pyruvylglycine lead to excessive nitrogen loads. Also, flooding plasma with glycine may interfere with the transport of some amino acids across the blood-brain barrier. Accordingly, these pyruvate compounds are less suited to treating an organ in vivo, and it is recognized that a need exists to provide a pyruvate delivery compound that is more physiologically acceptable [3].

One such potential compound is a pyruvylglycerol. This would be more stable and pH-neutral. The acylglycerol will be hydrolyzed to pyruvic acid by non-specific esterases present in plasma, tissues and the gastrointestinal tract as well as gastric and pancreatic lipases, and subsequently neutralized by the body's buffers.

Apart from the benefits of alpha-keto acids described above, they also confer other health benefits particularly due to their antioxidant capacity. This is possible because they can act as scavengers of free radicals and can also prevent lipid peroxidation by inhibiting formation of free radicals. This ensures their usefulness in prevention and treatment of disorders related to aging (such as cataract and glaucoma), diabetes, calcium overexcretion (as in osteoporosis) and cancers.

Structured lipids consisting of fatty acids esterified to the glyceryl backbone are known in the art. Structured triacylglycerols, in contrast to natural triacylglycerols, can be classified as any oil and fat modified or synthesized by any artificial means, such as hydrogenation, fractionation, blending, interesterification, esterification, and even from bioengineered plants. However, the common definition of structured triacylglycerols refers to those oils and fats containing polyunsaturated fatty acids and medium- or short-chain fatty acids, or those in which different fatty acids are specifically located in the glycerol backbone.

Most structured lipids have involved the interesterification of oils to rearrange the fatty acid distribution, to enhance either the content of PUFA or that of the medium-chain (MCFA—number of carbons=8, 10, 12) or short-chain fatty acids (SCFA—number of carbons=3, 4, 6). MCFA and SCFA are excellent sources of ready energy for the body due to their rapid absorption and are preferred because they have a low caloric value. Structured lipids containing MCFA are well known and their synthesis and composition have been widely reported [4–16].

Commercially available structured triacylglycerols include Salatrim™ (Benefat™ containing acetic, propionic, butyric and stearic acids esterified to glycerol) from Cultor Food Science and Nabisco Inc., Caprenin™ (caprocaprylobehenin, containing caprylic, capric and behenic acids esterified to glycerol) from Procter & Gamble, Captex™ from Abitec Corp., Neobee™ from Stepan Company, Impact™ from Novartis Nutrition, and Structo-lipid™ from Fresenius Kabi. Enzymatic interesterification with sn-1,3 specific lipases has also been used by industry for the production of structured lipids usable as cocoa butter substitutes [17–20].

Although the prior art shows that there has been relatively high degree of activity in designing triglycerides [21–36] for certain nutritional and medical uses, there is no teaching in any of the prior art, which refers to combining antioxidant short chain alpha-keto carboxylic acids with long-chain unsaturated fatty acids.

Pyruvate compounds such as pyruvate thiolester, glycerol-pyruvate ester or a dihydoxyacetone-pyruvate ester have been synthesized [37–39]. The glycerol-pyruvate esters synthesized were pyruvyl-diacetyl-glycerol and dipyruvyl-acetyl-glycerol. These were prepared by esterification of diacetin and monoacetin, respectively, with pyruvyl chloride. It appears that these are the only glyceryl pyruvate compounds reported in literature, whereby pyruvic acid is coesterified with a short-chain fatty acid such as acetic acid.

However, there is no suggestion or disclosure of a triacylglycerol or an oil containing pyruvic or other α-keto acids with widespread health benefits, and hence, for use as a nutraceutical or functional food bioactive.

Therefore, there is a need in the art for lipid composition, which includes triacylglycerols comprising an antioxidant moiety and nutritionally beneficial fatty acids and methods for forming such a lipid composition with relatively high yields.

SUMMARY OF INVENTION

The present invention provides a novel lipid composition, which delivers essential or beneficial fatty acids in an optimal manner with respect to stability and biosorptivity. Stability of the composition is enhanced by the inclusion of an antioxidant esterified to the glycerol backbone, preferably in a bioavailable manner. This lipid composition is useful as a nutraceutical as well as functional food ingredient. In this respect, the properties of the lipid are useful as it does not give rise to undesirable odors or flavors in food formulations, and does not have much impact on the physical properties of the functional food.

Lipid compositions of the present invention comprise triacylglycerols comprising fatty acids known to confer health benefits on their own or through their metabolic products, with respect to preventing or alleviating disorders/symptoms related to aging, inflammatory conditions, coronary heart disease, cancer and calcium retention. The fatty acid constituents are preferably essential or beneficial fatty acids, which are intrinsically stabilized by an antioxidant moeity that is part of the molecule. These compositions can be formulated as nutraceuticals and functional food ingredients.

The novel triacylglycerols of the present invention comprise ω-3 fatty acids as well as an antioxidant esterified to the glycerol backbone. Also present are other 16- and 18-carbon saturated and unsaturated fatty acids, so as to yield a composition with the essential fatty acids in an optimally desired n–3: n–6 fatty acid ratio of greater than about 2, preferably greater than about 2.5 and more preferably greater than about 3. This composition possesses a high degree of unsaturation, stabilized by the antioxidant, which also functions as a metabolic complement to the n–3 fatty acids. This structured lipid may assist in the prevention or treatment of diseases resulting from inflammation, oxidative stress (as in aging), cancers; and may assist in maintaining the health of the circulatory and nervous systems owing to the presence of essential (n–3) fatty acids which give rise to the biologically important fatty acids such as docosahexaenoic acid (DHA) and eicosapentaenoic acid (EPA). The antioxidant contributes by reducing oxidative stress, as well as by offsetting inhibition of energy-yielding pathways which occurs as a result of n–3 fatty acid metabolism. It is also a useful source of instant energy and therefore enhances the nutritional effects of the lipid composition. The lipid can be used as a dietary supplement or as the functional ingredient of functional foods such as cultured dairy products, confectioneries and nutritional bars and beverages.

It is believed that unsaturated fatty acids are also best absorbed in form of acylglycerols [40]. Hence, one preferred embodiment of this invention is a triacylglycerol with ALA and pyruvic acid as the major acyl components. Since the gastric and pancreatic lipases have a regioselectivity for the sn-1 and sn-3 hydroxyl positions on the glycerol backbone [41], the target compound should preferably have pyruvic acid esterified at one or both these positions. As the n–3:n–6 ratio is just as important as the absolute levels of ALA, the target compound may also contain small amounts of other fatty acids such as linoleic and oleic acids [42].

Therefore, in one aspect, the invention comprises a triacylglycerol comprising an antioxidant moiety, which is preferably an alpha-keto acid, and more preferably, pyruvic acid. The pyruvic acid may be esterified to any of the 3 carbons of the glycerol backbone, however, it is preferred that the pyruvic acid be esterified at the sn-1 or sn-3 positions. The remaining two fatty acids may be saturated or unsaturated and of any chain length. Preferably, at least one of the two fatty acids is an unsaturated fatty acid and more preferably, at least one of the two fatty acids is a precursor to DHA or EPA. ALA is a particularly preferred unsaturated fatty acid.

In another aspect, the invention comprises a lipid composition comprising a plurality of triacylglycerols, wherein a substantial number of the triacylglycerols comprise an antioxidant moiety, which is preferably an alpha-keto acid, and more preferably, pyruvic acid. The fatty acid composition of the lipid composition is preferably primarily unsaturated, with a ratio of unsaturated to saturated fatty acids of greater than about 7 being more preferred. A high proportion of unsaturated precursors to DHA or EPA, such as ALA, is also preferred.

In one aspect, the invention comprises a method of producing a lipid composition comprising the step of interesterifying a source oil or triacylglycerol mixture with pyruvic acid in molar excess, using a lipase catalyst. In a preferred embodiment, the source oil is a vegetable oil high in unsaturated content, such as perilla oil, flaxseed oil, hempseed oil, canola oil, or soybean oil, or mixtures thereof. Perilla oil and flaxseed oil, in particular, are known to have a high ALA content.

DETAILED DESCRIPTION

The present invention provides for a lipid composition comprising triacylglycerols incorporating a non-fatty carboxylic acid as an antioxidant moiety. A lipid composition comprising such triacylglycerols may be produced by interesterification of an antioxidant, which may be a non-fatty keto-carboxylic acid, with an oil containing predominantly triacylglycerols. This invention also comprises a compound blend lipid composition, containing predominantly a family of novel triacylglycerols. It is believed that this composition can provide a multitude of health benefits. When describing the present invention, all terms not defined herein have their common art-recognized meanings.

As used herein, the term "triacylglycerol" is synonymous with triglyceride and means an ester of glycerol (propane-1,2,3-triol) in which all three hydroxyl groups are esterified with a carboxylic acid. As used herein, an "antioxidant moiety" means a moiety which prevents or reduces oxidation of the triacylglycerol.

As used herein, the term "keto acid" refers to a molecule which is both a ketone and an acid. In most keto acids of interest to the present invention, the carbonyl group is on the carbon atom adjacent the carboxyl terminal carbon atom as shown in the formula

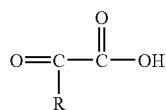
[t3]

wherein the keto acid is alpha-ketoglutaric acid if R is propanoic acid and wherein the keto acid is pyruvic acid if R is methyl as shown in the formulae:

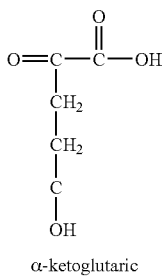
[t4]

α-ketoglutaric

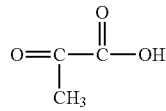
[t5]

As used herein, the term "fatty acid" refers to saturated or unsaturated aliphatic monocarboxylic acids which typically have an even number of carbon atoms. A long chain fatty acid has over 12 carbon atoms. A medium chain fatty acid has between 8 to 12 carbon atoms and a short chain fatty acid has between 3 to 6 carbon atoms. A "non-fatty carboxylic acid" refers to any carboxylic acid which is not a fatty acid. Examples of non-fatty carboxylic acids include dicarboxylic acids, aromatic acids and keto acids.

In general terms, the invention may comprise a triacylglycerol having the formula:

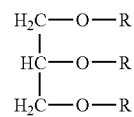
[t6]

wherein:
at least one of R1 or R3 is an antioxidant alpha-ketocarboxylic acid residue esterified to the glycerol backbone; and
the remainder of R1, R2 or R3 is a long-chain fatty acid residue. Preferably, the long-chain fatty acid is selected from the group consisting of C16 and C18 saturated and unsaturated fatty acids.

In one embodiment, the saturated fatty acid residues are esterified to glycerol in the primary positions as R1 or R3, opposite the antioxidant moiety. Unsaturated fatty acids may be selected from any of the three classes of C18 fatty acids: ω-3, ω-6 and ω-9 fatty acids.

In a preferred embodiment, the ratio of ω-3: ω-6 fatty acids is at least 2:1 on a molar basis, more preferably at least about 2.5:1, and most preferably greater than about 3:1. The ratio of unsaturated to saturated fatty acids is preferably greater than about 4 on a molar basis, and more preferably greater than about 7.

In a preferred embodiment of the lipid composition, a substantial proportion, but not necessarily a majority, of the triacylglycerols include the antioxidant. It is sufficient that enough triacylglycerol molecules include an antioxidant such that the antioxidant concentration in the lipid composition is greater than about 10 mol %, preferably greater than about 20 mol % and more preferably greater than about 30 mol %. However, it is not intended here to prescribe a minimum concentration of the antioxidant as even a small quantity of the antioxidant may have a beneficial effect. It is also preferred, but not essential, that the unsaturated fatty acids are predominantly ALA, with a concentration is the range of greater than about 10 mol %, more preferably greater than about 20 mol % and most preferably greater than about 35 mol %. In one particularly preferred embodiment, the antioxidant concentration is about 35 mol % with an ALA concentration of about 50 mol %.

The term "mole percent" or "mol %" refers to the number of moles of one component present in a total of 100 moles of all components. A preferred triacylglycerol of the invention has an antioxidant alpha-keto acid in the sn-1 position, ALA and other saturated or unsaturated fatty acids in the sn-2 and sn-3 positions. If the sn-3 fatty acid is unsaturated, it is preferred that it be a C18, ω-3, ω-6 or ω-9 fatty acid.

The antioxidant acids useful for this invention include but are not restricted to alpha keto acids such as pyruvic and alpha-ketoglutaric acids. The endowment of stability by these antioxidant acids is reflected in a relatively low peroxide value of 6.5 meq/kg lipid. The peroxide value is a measure of the level of hydroperoxides present in the lipid. These hydroperoxides are generally the first products of lipid oxidation; and therefore, the peroxide concentration is a direct measure of oxidative lability of the lipid.

Another aspect of the invention comprises a method of providing very long chain ω-3 polyunsaturated fatty acids such as DHA and EPA through their more stable precursors in form of acyl constituents of the lipid. Provision of precursors is also a superior way of providing the DHA and EPA, as their metabolism is less efficient than that of ALA. The conversion of ALA into DHA and EPA will then take place in a regulated manner in the body, as is well-known in the art.

Provision of keto-acid antioxidants and polyunsaturated fatty acids on the same molecule is believed to enhance the stability of the latter, as well as mitigate the effect of n–3 fatty acids on the inhibition of some glycolytic pathways. The esterification of both these components onto the glycerol backbone also enhances the biosorptivity and stability of the keto-acids. Keto-acids are relatively small molecules and are easily absorbed as compared to the long-chain fatty acids. They typically do not contribute caloric value to a diet. Rather, by virtue of being intermediates of key energy-yielding reactions in the glycolysis and TCA cycles, they are a source of relatively instant energy enabling further nutritional benefits.

The lipid composition of the invention may be made by any procedure commonly used to make structured lipids generally. A survey of techniques for producing specific-structured triacylglycerols may be found in Xu, "Production of specific-structured triacylglycerols by lipase-catalyzed reactions: a review", Eur. J. Lipid Sci. Tech. 2000, 287–303, the contents of which are incorporated herein. For example, esterification reactions of free fatty acids (in a certain proportion) and pyruvic acid/ester with glycerol, interesterification reactions (transesterification/acidolysis) of fatty acid esters or acylglycerols of oils with keto-acids or their esters, hydrolysis of lipids followed by reesterification of diacylglycerols with pyruvic acid/ester, etc. are some useful techniques. Using such methods, the end product is not a homogenous composition of a single triacylglycerol; the end product will be a lipid composition comprising many different triacylglycerols. Depending on the reactants used, the catalyst/enzyme that is used (or not used) and reaction conditions, a host of acylglycerols may be produced including but not restricted to the mixture of triacylglycerols and other acylglycerols (di- and mono-acylglycerols) described in the invention. All of the mixtures and structured lipids formed from the methods herein are within the scope of this invention.

For interesterification, the source oil may comprise mixtures of substantially pure triacylglycerols including ALA, linoleic acid, oleic acid in appropriate proportions. In a preferred embodiment, the source oil may be a naturally-occurring oil rich in unsaturated fatty acids, and ALA in particular, such as perilla oil (65%), flaxseed oil (50%), hempseed oil (25%), canola (9%), soybean oil (6–8%), amongst others. The antioxidant moiety can be introduced in form of its methyl or ethyl esters, or as free acid.

Pyruvic acid is stabilized by bonding to the glycerol backbone. Its bioavailability is ensured by its esterification at the primary hydroxyl positions (sn-1, sn-3), which are the sites of action for pancreatic and gastric lipases. Incorporation of pyruvic acid at the desired position can be achieved by judicious selection of lipases with respect to their selectivity/preference for active group position, substrate size, substrate unsaturation and position of unsaturation in substrate. The use of a lipase with a greater preference for a lower degree of unsaturation also ensures that more of the saturated fatty acids get knocked off the lipid substrate than unsaturated fatty acids. Use of lipases with primary hydroxyl preference would enable esterification-precisely in either of these positions. As a result, in a preferred embodiment, relatively high ratios of unsaturated fatty acids to saturated fatty acids, and n–3 to n–6, can be maintained. A suitable lipase may include that from *Carica papaya* latex which is obtained in a naturally-immobilized form. Other suitable lipases may be sourced from *Aspergillus niger, Candida lipolytica, Humicola lanuginosa, Mucor javanicus, Rhizomucor miehei, Penicilium* sp., *Rhizopus* sp., or *Psuedomonas* sp. Pancreatic lipases or pre-gastric esterases may also be suitable. Reactions are carried out using suitable solvent media. The choice of a suitable lipase is well within the skill of one skilled in the art, given the source oil to be used, the fatty or non-fatty acids to be incorporated, and the desired characteristics of the resulting lipid composition.

Purification of certain triacylglycerols or types thereof, if desired, can be achieved by standard techniques such as solvent evaporation, thin layer chromatography (TLC), column chromatography, preparative high-performance liquid chromatography (prep-HPLC), supercritical fluid chromatography (SFC), short-path distillation, as is well known in the art. Free fatty acids formed may be removed by distillation or other appropriate means.

The lipid composition of the present invention may be added as a nutraceutical supplement to prepared foods. 5–6 g of designer lipid per day (3 servings) should provide an adequate amount for fulfilling the daily requirements of the antioxidant and ALA of a typical person. This can be provided in form of dietary supplements or formulated into yoghurts and other cultured dairy products, nutrient bars, or any other foodstuff to which a lipid composition may be added. The resulting lipid has little color of its own (absorbance=0.052 at 480 nm). This makes the lipid more versatile for various delivery formulations such as yoghurts where it has no discernable effect on color or pH (change of 3%) and little impact on yoghurt viscosity (change of 10%) for lipid concentrations of up to 3% (w/w) in yoghurt.

The following examples are intended only to be exemplary of the claimed invention and not to be restrictive or limiting in any manner.

EXAMPLE I

Interesterification

In one embodiment, a lipid composition of the present invention was made by interesterification of flaxseed oil with pyruvic acid, in a 1:5 molar ratio and catalyzed by an immobilized sn-1,3 regioselective lipase from *Rhizomucor miehei*. The interesterification was carried out at 50° C. for about 7 hours.

Phase separation of the reaction contents yielded a pyruvic acid rich aqueous phase which also contains the lipase and a top organic phase containing the reacted and unreacted lipids. The oil phase was purified by preparative thin-layer chromatography (TLC) on silica gel G plates using a solvent mixture of hexane, diethyl ether and acetic acid (70:30:1) as the mobile phase. As a result, the lipids were fractionated into triacylglycerols (78%), diacylglycerols (9%), monoacylglycerols (4%) and free fatty acids (9%).

The triacylglycerol fraction was scraped from the plate and eluted with water saturated diethyl ether, which was then evaporated and the remaining lipid collected. Unreacted pyruvic acid and the immobilized lipase may be recycled for reuse.

Pyruvate content and fatty acid composition of the acylglycerols were analyzed by spectrophotometry and gas chromatography, respectively.

Spectrophotometry

The sample was dissolved in ethanol (for oil samples) or deionized water (for aqueous samples) to give a total volume of 2 ml. 18 ml of deionized water were further added and the contents of the vial vortexed. To 1 ml of the above, was added 1 ml of 0.125 g/L dinitrophenylhydrazine (DNPH) reagent and 1 ml deionized water. The vial contents were incubated at 37° C. for 10 min, after which 5 ml of 0.6N sodium hydroxide were added, again followed by vortexing. Absorbance was read at a wavelength of 420 nm on a Beckmann Diode Array spectrophotometer.

Pyruvate concentration in the sample was then calculated by comparing the absorbance with that of a standard sample of pyruvic acid of known concentration.

Gas Chromatogrphy (GC)

Fatty acid analysis was carried out by converting all fractions into their methyl esters. The TLC fractions are redissolved in 1 ml diethyl ether and methylated by addition of 50 μL 0.2N methanolic (m-trifluoro-methylphenyl) trimethylammonium hydroxide (TMTH) per 50 mg initial lipid and allowed to stand under ambient conditions for 20–30 minutes and injected onto the gas chromatograph after adding methyl myristate as an internal standard. The gas chromatograph used was a Hewlett Packard HP5890 equipped with a flame ionization detector (FID). Fatty methyl esters were separated on a 0.25 μm BPX70 column (25 m×0.32 mm i.d.) using helium as the carrier gas and temperature programming as follows: 2 min at 35° C., followed by heating at 7° C./min to 250° C., and finally for 1.5 min at 250° C. Injections were splitless and the injector and detector temperatures were 250° C. and 300° C., respectively. Peak areas and percentages were calculated using an integration pack using response factors.

Fatty acid concentrations were calculated by comparing the peak area with that of the internal standard.

Results

95% of pyruvate incorporated was found to occur into the triacylglycerols (TAG) and the remainder into diacylglycerols (DAG).

TABLE 1

Pyruvate distribution in the reaction system after 7 h

| | Pyruvic acid (%) |
|---|---|
| Initial pyruvate | 100 |
| TAG pyruvate | 18.43 |
| DAG pyruvate | 5.32 |
| Unused pyruvate | 76.08 |
| Reusable pyruvate | 71.57 |

TABLE 2

Triacylglycerol and diacylglycerol long-chain fatty acyl composition after 7 h

| mol % | Palmitic | Stearic | Oleic | Linoleic | ALA |
|---|---|---|---|---|---|
| TAG | 8.00 | 4.28 | 21.57 | 15.17 | 50.99 |
| DAG | 10.79 | 4.78 | 32.44 | 19.73 | 32.27 |

EXAMPLE II

Formulation of Lipid Product into Yoghurt

In this example, a lipid composition was prepared so as to yield a pyruvic acid concentration of 7.6% w/w lipid (30 mol %). The ALA content was 40% w/w lipid (48 mol %). Three different yoghurts were used for formulation purposes: plain, soy and bumbleberry yoghurt. Lipid was stirred into the yoghurt to yield different concentrations ranging from 0 to 3%) and a study on the physical characteristics of the fortified and unfortified yoghurts was conducted. ♣Peroxide value: 65% less than that of the parent oil. ♣Color & Texture: Unaffected at all concentrations. ♣Taste and odor: Masking of these properties entirely in the bumbleberry yoghurts. In the regular and soy yoghurts, an alteration in both taste and odor of yoghurts was noticed beyond 1% lipid.

| Yogurt Type | Lipid (%) | pH | Temp (° C.) | Viscosity (mPa · s/g) | Viscosity Change (%) |
|---|---|---|---|---|---|
| Regular: No Fat | 0.00 | 3.98 | 5 | 23.06 | 100.00 |
| | | | 25 | 3.00 | 100.00 |
| | | | 37 | 2.28 | 100.00 |
| Regular: No Fat | 0.74 | 4.01 | 5 | 23.61 | 102.39 |
| | | | 25 | 3.43 | 114.29 |
| | | | 37 | 2.63 | 115.13 |
| Regular: No Fat | 0.99 | 3.97 | 5 | | |
| | | | 25 | 2.77 | 92.39 |
| | | | 37 | 2.18 | 95.51 |
| Regular: No Fat | 2.00 | 3.93 | 5 | | |
| | | | 25 | 3.10 | 103.18 |
| | | | 37 | 2.44 | 107.03 |
| Regular: No Fat | 3.01 | 3.92 | 5 | 24.49 | 106.21 |
| | | | 25 | 3.21 | 106.99 |
| | | | 37 | 2.51 | 110.08 |
| Soy: Regular | 0.00 | 3.96 | 5 | 26.12 | 100.00 |
| | | | 25 | 4.21 | 100.00 |
| | | | 37 | 3.73 | 100.00 |
| Soy: Regular | 0.77 | 3.95 | 5 | | |
| | | | 25 | 5.12 | 121.70 |
| | | | 37 | 4.32 | 115.78 |
| Soy: Regular | 1.02 | 3.94 | 5 | | |
| | | | 25 | 4.85 | 115.34 |
| | | | 37 | 4.22 | 113.07 |
| Soy: Regular | 1.98 | 3.92 | 5 | | |
| | | | 25 | 4.92 | 116.87 |
| | | | 37 | 4.20 | 112.66 |
| Soy: Regular | 2.80 | 3.86 | 5 | 26.25 | 100.51 |
| | | | 25 | 4.61 | 109.57 |
| | | | 37 | 3.73 | 100.00 |
| Fruit: No Fat (Bumbleberry) | 0.00 | 3.83 | 5 | 34.91 | 100.00 |
| | | | 25 | 4.78 | 100.00 |
| | | | 37 | 3.67 | 100.00 |
| Fruit: No Fat (Bumbleberry) | 0.78 | 3.82 | 5 | | |
| | | | 25 | 6.62 | 138.51 |
| | | | 37 | 3.32 | 90.51 |
| Fruit: No Fat (Bumbleberry) | 0.96 | 3.81 | 5 | | |
| | | | 25 | 5.36 | 112.11 |
| | | | 37 | 4.52 | 123.00 |
| Fruit: No Fat (Bumbleberry) | 2.00 | 3.81 | 5 | | |
| | | | 25 | 5.35 | 111.85 |
| | | | 37 | 4.38 | 119.27 |

-continued

| Yogurt Type | Lipid (%) | pH | Temp (° C.) | Viscosity (mPa · s/g) | Viscosity Change (%) |
|---|---|---|---|---|---|
| Fruit: No Fat (Bumbleberry) | 3.01 | 3.78 | 5 | 33.14 | 94.93 |
| | | | 25 | 5.26 | 109.96 |
| | | | 37 | 4.30 | 117.20 |
| Parent oil | 100.00 | | 5 | 10.89 | 100.00 |
| | | | 25 | 4.74 | 100.00 |
| | | | 37 | 3.59 | 100.00 |
| Pure lipid | 100.00 | | 5 | 10.62 | 97.55 |
| | | | 25 | 4.68 | 98.68 |
| | | | 37 | 3.42 | 95.25 |

References:

The following references are referred to herein by number and are incorporated herein as if reproduced in their entirety.

1. Sinclair, A. J., Li, D., The Significance of Alpha-linolenic Acid for Humans, *J. Oleo Sci.* 50: 373–379, 2001.
2. Unexpected results from AD/HD study may yield important insights, http://www.bcm.tmc.edu/cnrc/win98.htm 3.Br
3. Brunengraber, H., Bomont, C., David, F., Hallowell, P. T., Pyruvate compounds and methods for use thereof, U.S. Pat. No. 5,876,916 (1999).
4. Fomuso L B, Akoh C C, Lipase-catalyzed acidolysis of olive oil and caprylic acid in a bench-scale packed bed bioreactor, *Food Res. Intl.*, 35:15–21, 2002.
5. Lee K T, Akoh C C, Dawe D L, Effects of structured lipid containing omega-3 and medium chain fatty acids on serum lipids and immunological variables in mice, *J. Food Biochem.*, 23: 197208, 1999.
6. Mu H, Xu X, H ø y CE, Production of specific-structured triacylglerols by lipase-catalyzed interesterification in a laboratory-scale continuous reactor, *J. Am. Oil Chem. Soc.*, 75: 11871193, 1998.
7. Xu X, Balchen S, H φ γ CE, Adler-Nissen J, Production of specific structured lipids by enzymatic interesterification in a pilot continuous enzyme bed reactor, *J. Am. Oil Chem. Soc.*, 75: 15731579, 1998.
8. Xu X, Fomuso L B, Akoh C C, Synthesis of structured triacylglycerols by lipase-catalyzed acidolysis in a packed bed bioreactor, *J. Agric. Food Chem.*, 48: 310, 2000.
9. Seiden P, Reduced calorie fats made from triglycerides containing medium and long chain fatty acids, U.S. Pat. No. 5,288,512 (1994).
10. Bistrian B R, Method of treating cancer using structured lipids, U.S. Pat. No. 5,081,105 (1992); Canadian Patent CA 2074492 (1992).
11. Babayan V K, Blackburn G L, Bistrian B R, Structured lipid containing dairy fat, U.S. Pat. No. 4,952,606 (1990); Canadian Patent CA 1330633 (1989).
12. DeMichele S J, Karlstad M D, Bistrian B R, Mascioli E A, Structured lipids, Canadian Patent CA 2151820 (1995).
13. Bistrian B R, Babayan V K, Blackburn G L, Mascioli E A, Dietary supplement utilizing omega-3/medium chain trigylceride mixtures, U.S. Pat. No. 4,871,768 (1989), Canadian Patent CA 1324155 (1993); World Patent WO8902275 (1989).
14. DeMichele S J, Karlstad M D, Bistrian B R, Mascioli E A, Structured lipid containing gamma-linolenic or dihomogamma-linolenic fatty acid residue, a medium chain (C6–C12) Fatty acid reside and a N–3 fatty acid residue, U.S. Pat. No. 5,962,712 (1999).
15. Babayan V K, Blackburn G L, Bistrian B R, Triglyceride preparations for the prevention of catabolism, U.S. Pat. No. 4,847,296 (1989).
16. Yang D K, Tailored triglycerides having improved autoignition characteristics, U.S. Pat. No. 4,832,975 (1989).
17. Akoh C C, *Structured lipids*. In: Food Lipids: Chemistry, Nutrition, and Biotechnology, C. C. Akoh, D. B. Min (Eds.), Marcel Dekker Inc., New York, USA, pp. 699727, 1998.
18. Bornscheuer U T, Kazlauskas R J, Hydrolases In Organic Synthesis: Regio- And Stereo-Selective Biotransformation, Wiley-VCH, Weinheim, Germany, 1999.
19. Quinlan P, Moore S, Modification of triglycerides by lipases: process technology and its application to the production of nutritionally improved fats, *Intl. News Fats Oils Rel. Mater.*, 4: 580585, 1993.
20. Bunczek M T, Meyers M A, Yatka R J, Mazzone P, Broderick K B, Record D W, Improved chewing gum containing structured lipids, Canadian Patent CA 2204141 (1997).
21. Akoh C C, Structured lipids, U.S. Pat. No. 6,369,252 (2002).
22. Akimoto K, Yaguchi T, Fujikawa S, Triglyceride and composition comprising the same, U.S. Pat. No. 6,248,909 (2001).
23. Freedman S, Alvarez J G, Methods for treating disorders in which docosahexaenoic acid (DHA) levels are affected, U.S. Pat. No. 6,180,671 (2001).
24. DeMichele S J, Lee T W, Tso P, Method for enhancing the absorption and transport of lipid soluble compounds using structured glycerides, U.S. Pat. No. 6,160,007 (2000).
25. Del Vecchio A J, Food products containing structured triglycerides, U.S. Pat. No. 6,103,292 (2000); Canadian Patent CA 2251786 (1998).
26. Wheeler E L, D'Amelia R P, Leveille G A, Otterburn M S, Klemann L P, Finley J W, Roden A D, Chrysam M M, Pelloso T A, Given Jr P S, Reduced calorie triglyceride mixtures, U.S. Pat. No. 5,552,174 (1996); U.S. Pat. No. 5,565,232 (1996); U.S. Pat. No. 5,456,939 (1995); U.S. Pat. No. 5,411,756 (1995); U.S. Pat. No. 5,378,490 (1995); U.S. Pat. No. 5,258,197 (1993).
27. Bistrian B R, Short chain triglycerides, U.S. Pat. No. 5,312,836 (1994); Canadian Patent CA 2051640 (1991).
28. DeMichele S J, Karlstad M D, Bistrian B R, Mascioli E A, Structured lipid containing gamma-linolenic or dihomogamma-linolenic fatty acid residue, a medium chain ($C_6$–$C_{12}$) fatty acid residue, and a n–3 fatty acid residue, U.S. Pat. No. 5,661,180 (1997).
29. Xu X, Production of specific-structured triacylglycerols by lipase-catalyzed reactions: A Review, *Eur. J. Lipid Sci. Technol.*, 287303, 2000.
30. Fomuso L B, Akoh C C, Enzymatic modification of triolein: Incorporation of caproic and butyric acids to produce reduced-calorie structured lipids, *J. Am. Oil Chem. Soc.*, 74: 269–272 (1997).
31. Namal Senanayake S P J, Shahidi F, Enzyme-catalyzed synthesis of structured lipids via acidolysis of seal (*Phoca groenlandica*) blubber oil with capric acid, *Food Res. Intl.*, 35: 745–752, 2002.
32. Fomuso L B, Akoh C C, Structured lipids: Lipase-catalyzed interesterification of tricaproin and trilinolein, *J. Am. Oil Chem. Soc.*, 75: 405–410, 1998.
33. Akoh C C, Making new structured fats by chemical reaction and enzymatic modification, *Lipid Technol*, 61–66, May 1997.
34. Akoh C C, Yee L N, Enzymatic synthesis of position-specific low-calorie structured lipids, *J. Am. Oil Chem. Soc.*, 74:1409–1413, 1997.
35. Lee K-T, Akoh C C, Immobilized lipase-catalyzed production of structured lipids with eicosapentaenoic acid at specific positions, *J. Am. Oil Chem. Soc.*, 73:611–615, 1996.

36. Lee K-T, Akoh C C, Characterization of enzymatically synthesized structured lipids containing eicosapentaenoic, docosahexaenoic, and caprylic acids, *J. Am. Oil Chem. Soc.,* 75: 495–499, 1998.

37. Brunengraber H, Bomont C, David F, Hallowell P T, Pyruvate compounds and methods for use thereof, U.S. Pat. No. 5,968,727 (1999).

38. Brunengraber H, Bomont C, David F, Hallowell P T, Pyruvate compounds and methods for use thereof, U.S. Pat. No. 5,876,916 (1999).

39. Brunengraber H, Bomont C, David F, Hallowell P T, Cooper K D, Kasoumov T, Medical uses of pyruvates, U.S. Pat. No. 6,086,789 (2000).

40. Cunnane S C, Chen Z Y, Quantitative changes in long-chain fatty acids during fetal and early postnatal development in rats, *Am J Physiol,* 262 (1 Pt 2), R14–R19, 1992.

41. Huang Y-S, Lin X, Redden P R, Horrobin D F, In vitro hydrolysis of natural and synthetic gamma-linolenic acid containing triacylglycerols by pancreatic lipase. *J. Am. Oil Chem. Soc,* 72:625–631, 1995.

42. Lauritzen L, Hansen H S, Jorgensen M H, Michaelsen K F, The essentiality of long chain n–3 fatty acids in relation to development and function of the brain and retina, *Progr. Lipid Res.* 40: 1–94, 2001.

As will be apparent to those skilled in the art, various modifications, adaptations and variations of the foregoing specific disclosure can be made without departing from the scope of the invention claimed herein. The various features and elements of the described invention may be combined in a manner different from the combinations described or claimed herein, without departing from the scope of the invention.

What is claimed is:

1. A triacylglycerol comprising at least one unsaturated long chain fatty acid ester residue having greater than 12 carbon atoms and an antioxidant ester comprising a non-fatty carboxylic acid residue.

2. The triacylglycerol of claim 1 wherein the non-fatty carboxylic acid is an α-keto acid.

3. The triacylglycerol of claim 2 wherein the α-keto acid is pyruvic acid or α-ketoglutaric acid.

4. The triacylglycerol of claim 1 wherein the at least one long-chain fatty acid comprises an omega-3 fatty acid.

5. The triacylglycerol of claim 4 further comprising a long-chain fatty acid which is either saturated or unsaturated.

6. The triacylglycerol of claim 4 wherein the omega-3 fatty acid is a precursor of docosahexanoic acid or eicosapentaenoic acid.

7. The triacylglycerol of claim 6 wherein the omega-3 fatty acid is α-linolenic acid.

8. A triacylglycerol comprising a α-keto acid in the sn-1 or sn-3 position, α-linolenic acid in the sn-2 position and saturated or unsaturated C18 fatty acid in the sn-1 or sn-3 position not occupied by the α-keto acid.

9. The triacylglycerol of claim 8 wherein the α-keto acid comprise pyruvic acid or α-ketoglutaric acid.

10. A triacylglycerol of the formula:

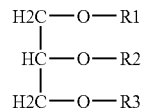

wherein R1 is a keto acid residue and R2 and R3 are long chain fatty acids resudues.

11. The triacylglycerol of claim 10 wherein R3 comprises an unsaturated fatty acid residue.

12. The triacylglycerol of claim 11 wherein the unsaturated fatty acid residue comprises an omega-3 fatty acid residue which is a precursor of docosahexanoic acid or eicosapentaenoic acid.

13. The triacylglycerol of claim 12 wherein the omega-3 fatty acid residue is an α-linolenic acid residue.

14. The triacylglycerol of claim 10 wherein R1 is an α-keto acid residue, R2 is a saturated or unsaturated long chain fatty acid residue and R3 is an α-linolenic acid residue.

* * * * *